(12) United States Patent
Dybdal et al.

(10) Patent No.: US 6,965,343 B1
(45) Date of Patent: Nov. 15, 2005

(54) SYSTEM AND METHOD FOR ANTENNA TRACKING

(75) Inventors: Robert B. Dybdal, Palos Verdes Estates, CA (US); Denny D. Pidhayny, Los Angeles, CA (US); Don J. Hinshilwood, Carson, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/872,094

(22) Filed: Jun. 17, 2004

(51) Int. Cl.[7] .............................. H01Q 3/00; G01S 5/02
(52) U.S. Cl. ....................... 342/359; 342/372; 342/424
(58) Field of Search ............................... 342/371, 372, 342/374, 424, 359, 354, 383

(56) References Cited

U.S. PATENT DOCUMENTS

| | | | |
|---|---|---|---|
| 3,085,204 A * | 4/1963 | Sletten | 455/116 |
| 3,267,472 A * | 8/1966 | Fink | 342/368 |
| 3,434,139 A * | 3/1969 | Algeo | 343/778 |
| 3,540,050 A * | 11/1970 | Schmidt | 342/368 |
| 3,618,092 A * | 11/1971 | Waineo | 342/149 |
| 3,931,624 A * | 1/1976 | Hundley et al. | 343/768 |
| 4,050,074 A * | 9/1977 | Toman | 342/408 |
| 4,231,040 A * | 10/1980 | Walker | 342/373 |
| 4,306,238 A * | 12/1981 | Enein | 342/408 |
| 4,772,893 A | 9/1988 | Iwasaki | |
| RE33,401 E * | 10/1990 | Chisholm | 342/408 |
| 5,025,493 A | 6/1991 | Cook, Jr. | |
| 5,506,589 A * | 4/1996 | Quan et al. | 342/373 |
| 5,661,489 A | 8/1997 | Baker | |
| 5,949,370 A * | 9/1999 | Smith et al. | 342/354 |
| 5,952,962 A | 9/1999 | Dybdal | |
| 6,646,599 B1 | 11/2003 | Apa et al. | |

* cited by examiner

*Primary Examiner*—Gregory C. Issing
(74) *Attorney, Agent, or Firm*—Henricks, Slavin & Holmes LLP

(57) ABSTRACT

A method for antenna tracking includes providing a central feed element in an antenna focal region with additional feed elements in an azimuth coordinate to provide a multitude of feed elements that each have a static beam position, and varying ratios of amplitudes of adjacent feed elements of the multitude of feed elements to electronically steer a beam between the static beam positions.

17 Claims, 4 Drawing Sheets

SYSTEM AND METHOD FOR ANTENNA TRACKING

TECHNICAL FIELD

The invention relates generally to antenna tracking and, in particular, to high elevation angle antenna tracking of low altitude satellites.

BACKGROUND ART

Antenna tracking refers to alignment of an antenna main beam with a satellite (or other moving object) being tracked. For example, antenna systems that are used to receive information from and/or transmit information to a satellite in a low earth orbit should be able to follow the dynamics of the satellite in its orbital trajectory. Referring to FIGS. 1A and 1B, the trajectory dynamics for an example high elevation angle pass 200 (illustrated in FIG. 2) are most pronounced in the azimuth coordinate, and the elevation variations are substantially lower. The specific conditions for these numerical values are a 450 nmi polar orbiting satellite altitude, as used by meteorological satellites, and the maximum elevation angle is 85° for this example. While these dynamics for the required antenna motion are presented for a specific case, the general characteristics for low earth orbit satellites are illustrated. The dynamics required to track the satellite are most severe in the azimuth plane, and these dynamics increase with decreasing orbital altitude and increasing maximum elevation angle. The problem of tracking a satellite at high elevation angles becomes more severe when large high gain antennas having a narrow beamwidth are employed.

Prior approaches to addressing this problem involve mechanically tilting the antenna away from the normal so that the high elevation angle travel required by the positioner is removed. In practice, both a fixed wedge angle and a third axis have been used. However, these mechanical techniques can be complex and/or costly. Furthermore, the expenses of positioner drive power and antenna stiffness needed for the dynamic motion are incurred when high antenna dynamics are required.

Thus, it would be useful to be able to provide an antenna-tracking alternative to the prior mechanical approaches. It would also be desirable to be able to provide less complex and/or costly antenna tracking.

DISCLOSURE OF INVENTION

The present invention involves a system and method for antenna tracking that use an amplitude scanning technique to provide electronic steering in the azimuth plane. An electronic mechanism for maintaining antenna tracking, suitable for following the dynamics in antenna tracking of low earth orbit satellites at high elevation angles, is described herein.

In practice, the amplitude scanning technique can be implemented by augmenting a central feed in an antenna focal region with additional feed elements around the central feed in the azimuth direction. By varying ratios of amplitudes of adjacent feed elements, a beam is electronically steered between the static beam positions of each individual feed. The system and method described herein provide electronic beam steering, which reduces the mechanical dynamics required when a satellite is in the high elevation angle portion of its motion.

Figure 2:
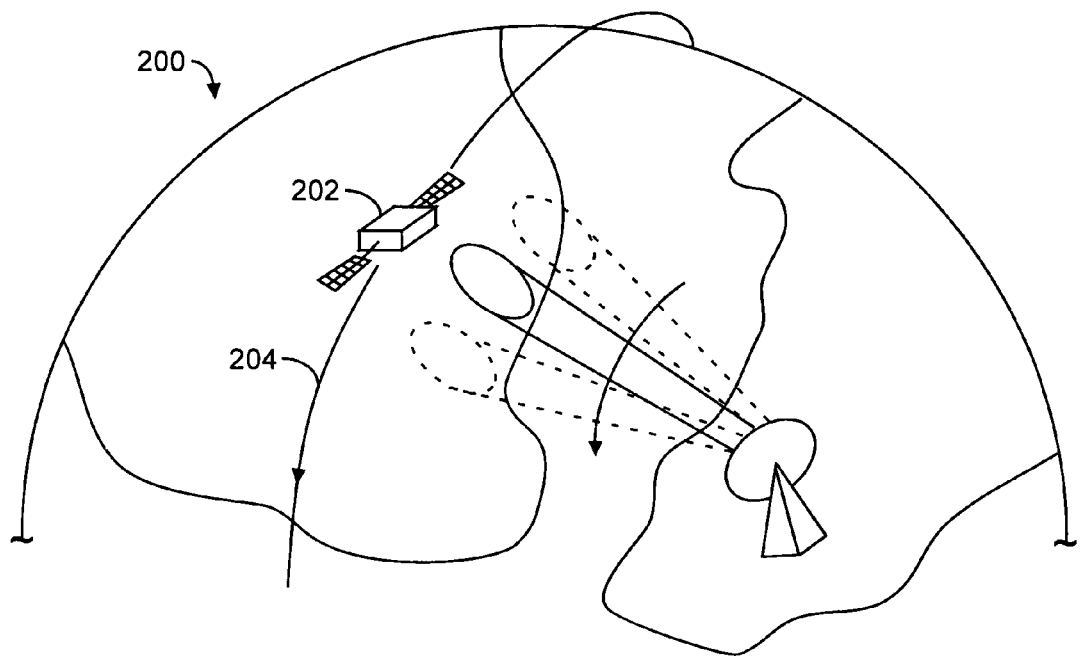
FIG. 2 illustrates an example of a high elevation angle pass by a satellite, and an example method for progressively steering a beam in the azimuth direction by employing an electronic combination of feeds.
Figure 3:
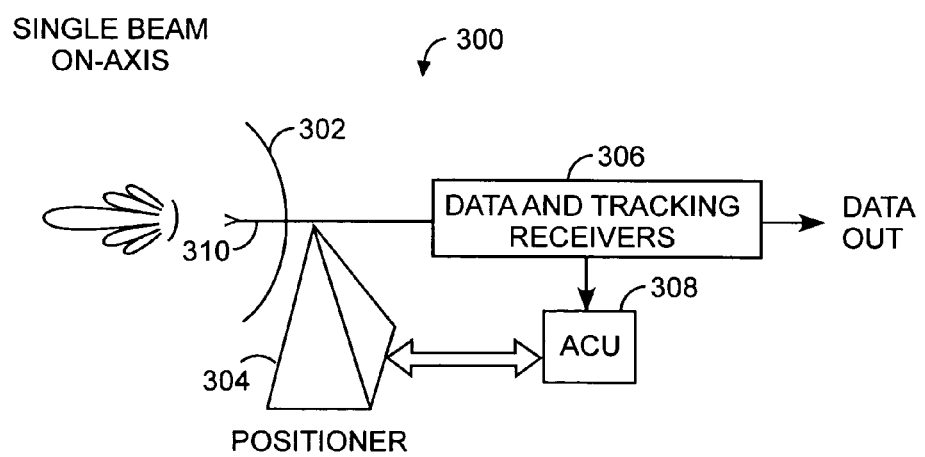
FIG. 3 illustrates an example terminal design for mechanical beam steering.

Embodiments of the present invention can be implemented by combining both mechanical and electronic beam steering techniques. As to the former, and referring to FIG. 3, an example system 300 for mechanical beam steering includes a reflector antenna 302 (and feed), a positioner 304 (e.g., an elevation over azimuth positioner), data and tracking receivers 306, and an antenna control unit (ACU) 308 configured as shown. In this example embodiment, the reflector antenna 302 has a single antenna feed 310 located at the focus of the reflector and thereby produces a single beam located on the axis of the reflector. The system 300 can also include a transmitter. In order for the reflector antenna 302 to track a satellite signal, the antenna positioner 304 provided the mechanical dynamics needed to align the antenna beam with the signal, following the dynamics of a satellite 202 (FIG. 2) in its orbital trajectory 204.

Figure 1A:
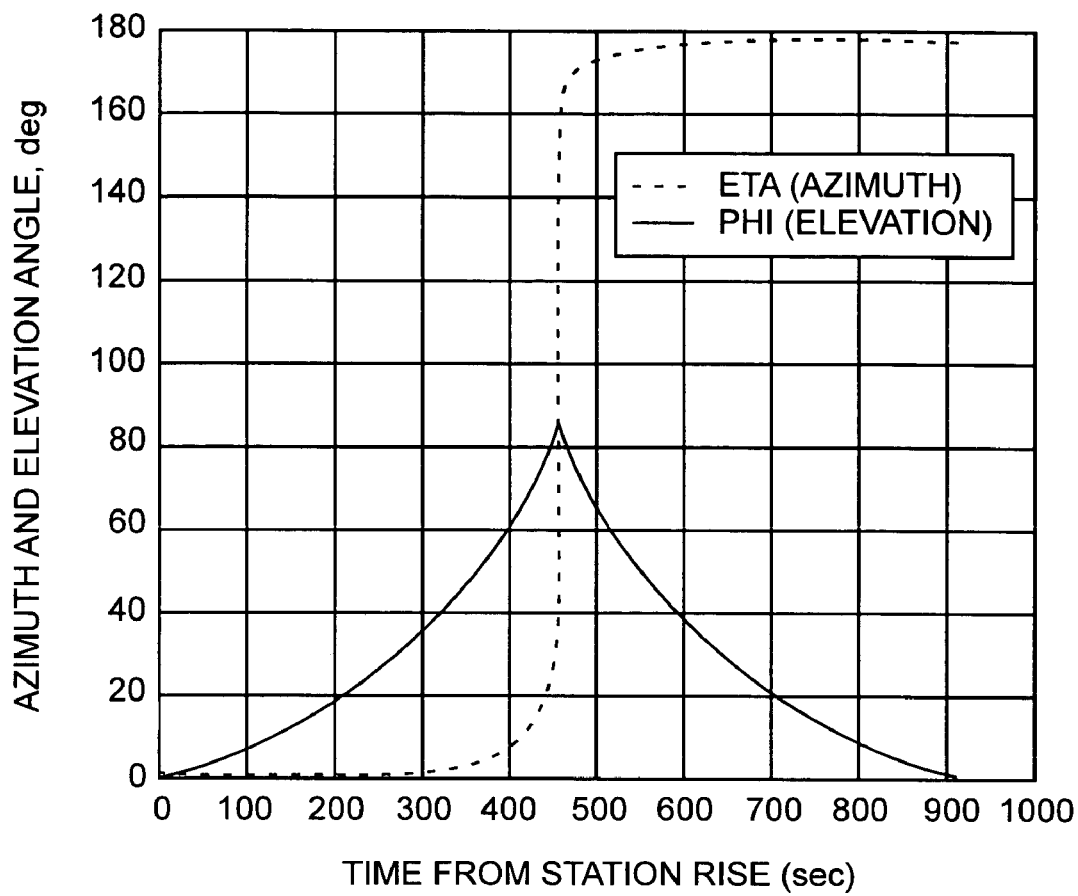
FIGS. 1A and 1B are plots illustrating angular and velocity variations, respectively, for an example high elevation angle pass.
Figure 1B:
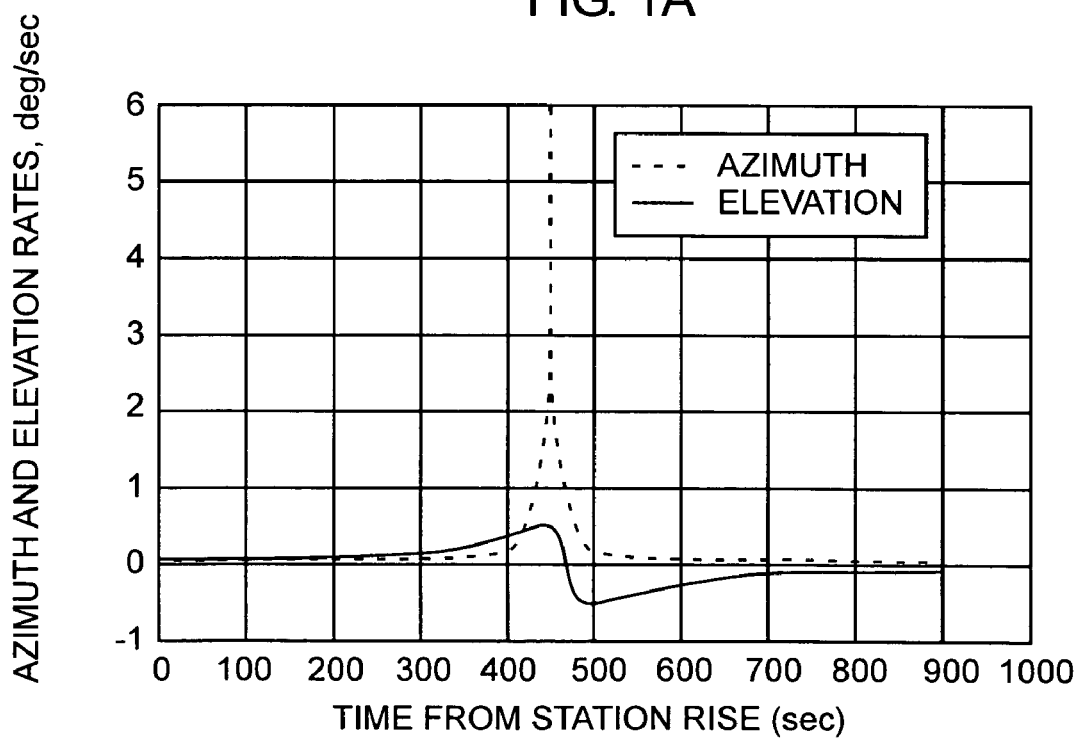

In operation, the location and orientation of the antenna with respect to true north is known, and the satellite ephemeris that describes the orbit of the satellite is also known. This information can be used to perform an a priori computation of the time history of the required antenna positioning, and accordingly, the dynamics of the antenna beam positioning as illustrated in FIG. 1. By way of example, two forms of antenna tracking can be used. One is an open loop design that aligns the antenna based on commanding the antenna to move in angular offsets and, from the difference in power levels observed in the tracking receiver at each of these angular offsets, determines the correct position of the antenna using computations performed within the antenna control system. This form of antenna tracking is commonly referred to as "step track." The second form of antenna tracking is a closed loop design that is commonly referred to as "monopulse." The antenna feed in this case produces two types of antenna patterns. One pattern is used for data reception and transmission and has a maximum antenna gain value coincident with the axis of the antenna. The second antenna pattern is used for antenna tracking, has a null coincident with the axis of the antenna, and, to first order, produces a linear variation in output as the antenna deviates from its axis. The antenna control system treats the tracking signal observed in the tracking receiver as an "error" signal. By minimizing the error signal, the antenna is aligned with the null in the antenna-tracking pattern. By design, the null of the tracking pattern is coincident with the peak of the data pattern and both are thereby aligned with the signal. Both antenna-tracking techniques dynamically respond to the dynamics of the signal direction (the open loop design by periodically verifying signal alignment, and the closed loop design by continuously verifying that the tracking signal has a minimum value).

Figure 4:
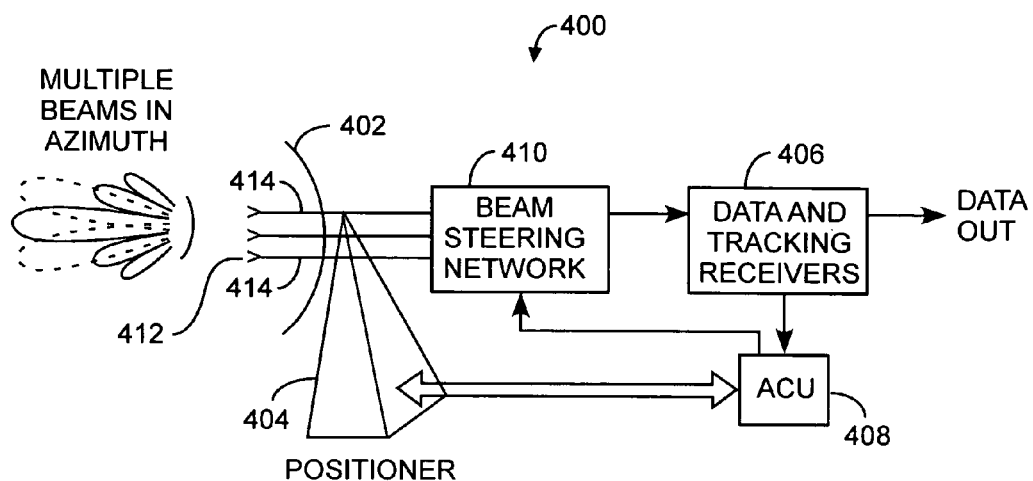
FIG. 4 illustrates an example terminal design for mechanical and electronic beam steering.

The combination of mechanical and electronic beam steering techniques is now described. Referring to FIG. 4, an example system 400 for mechanical and electronic beam steering includes a reflector antenna 402 (and feed elements), a positioner 404 (e.g., an elevation over azimuth positioner), data and tracking receivers 406, an antenna control unit (ACU) 408 and a beam steering network 410, configured as shown. In this example embodiment, the reflector antenna 402 has a central feed 412 in an antenna focal region with additional feeds 414 (also referred to as feed elements) around the central feed 412 in the azimuth direction. The system 400 can also include a transmitter.

In this example embodiment, an additional feed is provided on either side of the central feed. More generally, a multiplicity of antenna feed elements are arranged to provide a corresponding multiplicity of antenna beams in the azimuth plane. In operation, the antenna beam is electronically scanned by using this multiplicity of feed elements to follow the satellite in regions where the antenna tracking requires high dynamics in beam positioning. The electronic beam scanning thus reduces the required mechanical dynamics from the antenna positioner. The principles described herein can be used to provide a new terminal design, or to retrofit existing antenna systems. Moreover, the electronic beam scanning approach described herein can also be used to effect initial acquisition of a signal as described below in greater detail.

According to various embodiments, electronic beam scanning is provided by an appropriate amplitude combination of the multiple antenna feed elements. By way of example, consider two feeds in the multiplicity of feed elements. Each feed is located within the antenna focal region and offset from the reflector focus in a direction transverse from the antenna axis. Each feed by itself produces an antenna beam that is displaced from the on-axis central beam produced by the central feed located at the ideal focus of the reflector surface. As an antenna feed is displaced in a transverse direction from the antenna axis, the associated antenna beam is also removed from the axis in a direction opposite that of the transverse displacement. The further the feed is displaced, the further the beam is removed from the antenna axis. The limitation of this antenna feed displacement is the tolerable loss in gain and pattern shape. This loss in antenna performance results because the antenna feed is no longer ideally focused and a phase distortion in the aperture results degrading the pattern and gain performance of the displaced feed. As a practical matter, high gain antennas having a relatively large size and associated narrow beamwidth generally are configured in a Cassegrain geometry that permits generating off axis beams with acceptable quality for as much as ten beamwidths off axis. Thus, for an antenna with a one-degree beamwidth, the beam can be moved off axis ten degrees with acceptable quality. As indicated above, the beam steering approach described herein reduces the mechanical motion required from a relatively large physical structure by electronically scanning the beam rather than relying only on mechanically positioning the antenna.

Each of the multiple feed elements is capable of producing a discrete off axis beam. The mechanical requirements of beam positioning dynamics are reduced by continuously steering an antenna beam in the azimuth direction. By way of example, continuous beam steering can be achieved by combining two adjacent antenna feeds in amplitude. If the amplitude in one feed is unity and the amplitude in the adjacent feed is zero, the antenna produces a beam in the direction associated with the first feed, and vice versa. Similarly, if the amplitudes of the two feeds are identical, the resulting antenna beam lies halfway between the positions of the beams produced by the two feeds when used independently. Thus, as the amplitude is varied between two adjacent feeds, the beam is continuously electronically steered between the two static beam positions.

Figure 5:
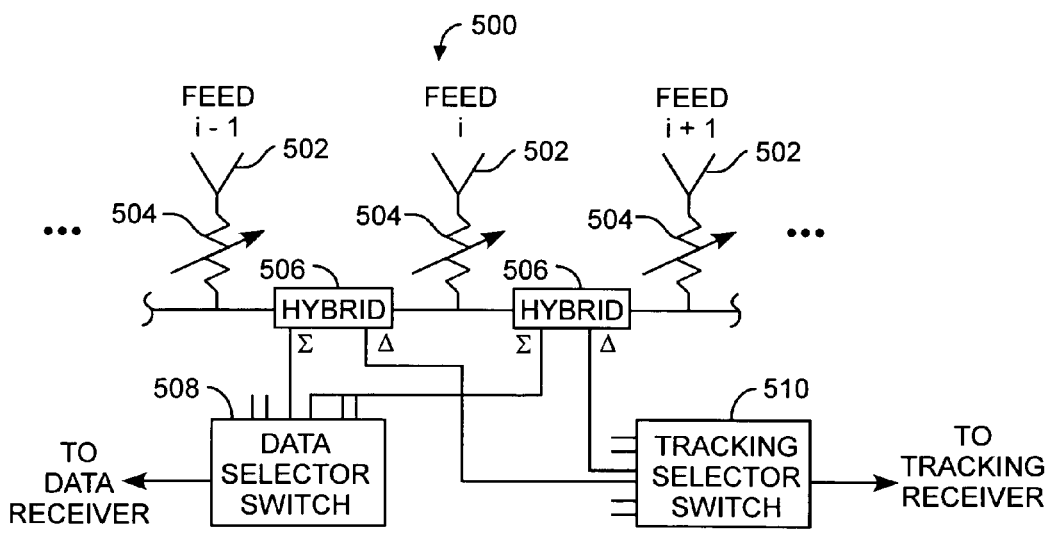
FIG. 5 illustrates an example beam steering network.

A practical implementation for this capability is now described when the antenna is used to receive signals. Referring to FIG. 5, an example beam steering network 500 includes multiple feeds 502 (each having a commandable attenuator 504), hybrids 506, a data selector switch 508 and a tracking selector switch 510, configured as shown. In an example embodiment, each feed 502 is provided with appropriate filtering and preamplification (not shown) to establish the system noise temperature. The commandable attenuator 504 for each feed is set to vary the amplitudes between adjacent feed elements. Each hybrid 506 combines (sums) the outputs of adjacent feeds. In operation, the ratio of commanded attenuators is set to provide the desired electronically scanned position of the resulting combined beam. By varying the ratio of the commanded attenuators, the beam is electronically steered between the static beam positions of each individual feed.

As shown in FIG. 5, each adjacent feed pair is connected through a hybrid, and a selector switch is used to select the hybrid that combines the beam pair. Alternatively, the hybrids can be combined through a power divider, and sufficient attenuation can be set to minimize the contributions of all feeds except for the two adjacent feeds that produce the desired scanned beam. In practice, the power divider combination requires sufficient gain in the preamplifiers to avoid degrading the overall antenna pattern and/or the system noise temperature.

The hybrids that combine the adjacent feeds have two output terminals. One of these terminals, labeled $\Sigma$, adds the two feed outputs to produce the scanned beam. The second terminal, labeled $\Delta$, subtracts the outputs of the two feeds and this terminal can also be used to verify that the scanned beam is aligned with the received signal. When the outputs of the two feeds are subtracted, the resulting pattern has a null that is coincident with the peak signal. Thus, by minimizing the signal level in the subtracted $\Delta$ terminal, the signal is aligned with the peak level of the summed signal. Additionally, a mechanism for controlling azimuth tracking is provided by continuously minimizing the signal power in the subtracted channel. By way of example, this minimization of the subtracted channel is performed by the antenna control unit and/or another processor. In an example embodiment, a ratio of the two received power levels is used and is therefore independent of the variations in the received signal power. Thus, power levels in the two channels are monitored with any changes in the incident field strength effectively being compensated for.

Figure 6:
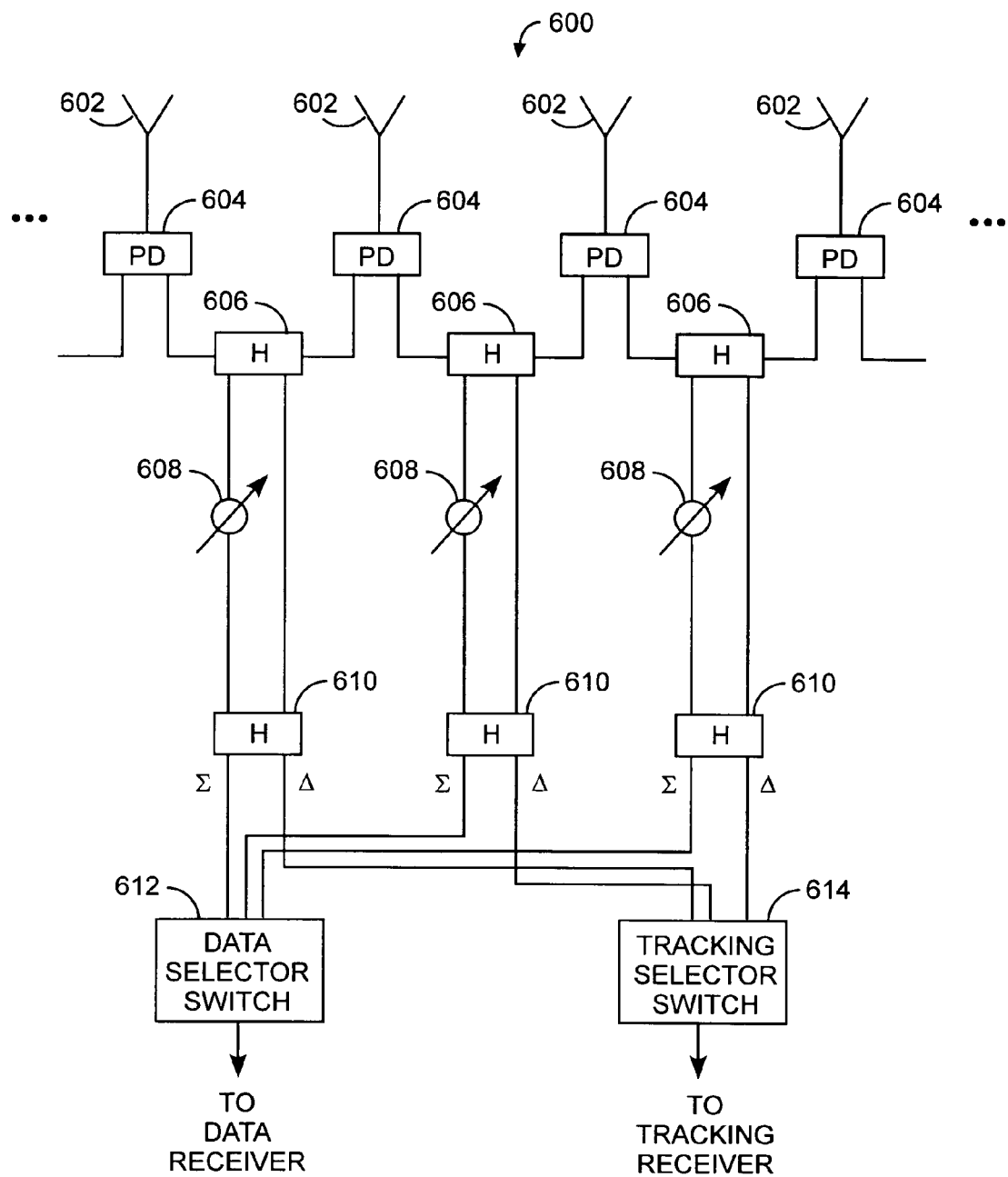
FIG. 6 illustrates an example mechanization of electronic beam steering.

Referring to FIG. 6, example electronic beam steering circuitry 600 includes multiple feeds 602, power dividers (PD) 604, first quadrature hybrids 606, phase shifters 608, second quadrature hybrids 610, a data selector switch 612 and a tracking selector switch 614, configured as shown. In an example embodiment, each feed element 602 contains appropriate RF filtering and preamplification (not shown) to reduce out-of-band signals and establish the system noise temperature. In this example embodiment, the output of each feed 602 is divided in two equal components by the power divider (PD) 604. One signal output from adjacent antenna feeds 602 is then combined in the first quadrature hybrid

606, e.g., a microwave transformer that splits an input signal into two equal parts with a 90° phase shift. As shown in this example embodiment, the two output ports of the first quadrature hybrid 606 are routed to the second quadrature hybrid 610 with a direct connection and a connection including the phase shifter 608 providing a range of 0–180°. This combination of two quadrature hybrids, the direct connection, and the phase shifter form a power divider that selects the desired amplitude combination from the two feed elements. These passive microwave components are commonly available and/or can be readily constructed. The sum port Σ is routed to the data selector switch 612 and then to the data receiver, and the difference port Δ is routed to the tracking selector switch 614 and then to the tracking receiver. The signal is tracked by minimizing the signal power in the difference port.

One feature of this example design is that stringent control of the amplitude tracking between the channels is not required. Because the signal levels are added and subtracted after the commanded settings of the attenuators (e.g., performed by a processor as discussed above), any gain drift or offset in the amplitude of the channels is automatically compensated because the same errors exist in both the data channel on the Σ terminal and the tracking channel on the Δ terminal.

Further with regard to the feed elements, if the beams are spaced such that they overlap at the half power point (−3 dB), the G/T (antenna gain divided by system noise temperature that defines receiving system sensitivity) variation as the beam is electronically scanned from one feed to the other is ideally zero. If the beams are spaced such that they overlap at the −6 dB point, the G/T at the center position is 3 dB lower than the G/T of a single beam. This amplitude ripple, however, reduces the number of feed elements required thereby reducing system complexity and corresponding expense. When the beams overlap at the half power point, the number of feeds equals the beam widths to be scanned. When the beams overlap at the −6 dB point, the number of feeds equals the beam widths to be scanned divided by 1.4. In practical applications, the satellite is closest to the terminal at the high elevation angles and the antenna temperature component of the system noise temperature is lower. Thus, sufficient system margin may exist to allow some G/T variation with beam scanning to reduce the number of additional feed elements and thereby the design complexity.

Operation in a receive mode has been described above. In various embodiments, operation in a transmit mode can use the same general architecture. However, the transmit frequency is most often different from the receive frequency to maintain isolation between receive and transmit signals. The beam steering technique described herein generally has a broad bandwidth and therefore the transmit beam can also be electronically scanned by commanding the same attenuator values. However, loss in the attenuators reduces the transmitted power. Thus, for various transmit mode embodiments, the attenuators are commanded from the receive values at the drive level. In an example configuration, each feed horn is followed with a diplexer that separates the receive and transmit signals, the receive side contains the beam steering circuitry as described above, and the transmit side has the same attenuators in each path to the diplexer at the drive level and transmit amplifiers following the drive circuitry and connected to each feed. The amplifiers are turned on for the pair of feeds being used. In an example embodiment, the transmit amplifiers operate in a linear rather than saturated operating point.

In various embodiments, the required beam positioning dynamics are computed in advance of the satellite pass from the terminal location and the satellite ephemeris. If the maximum elevation angle during the pass has a low value, the required beam positioning dynamics are minimal, and only the central feed in the collection of feeds is used for data transfer. However, and referring to FIG. 2, when a high elevation angle satellite orbit is to be tracked, the additional feeds in the multiplicity of feed elements are used to electronically scan the beam to augment the mechanical scanning of the reflector antenna. In operation, prior to the high velocity portion of the satellite trajectory, the extreme feed is selected to form an antenna beam in the direction of the satellite. The electronic repositioning is accomplished continuously by varying the amplitude combination of the antenna feeds in the path towards the other extreme beam position. As the satellite proceeds towards the maximum elevation angle position where the dynamics are most severe, the electronic combination of the beams is varied towards the other extreme beam position. In this way, the electronic beam steering reduces the mechanical antenna dynamics while tracking the satellite. As the satellite approaches its maximum elevation point, the electronic beam scanning repositions the received beam to the location corresponding to the central beam. As the satellite passes the maximum elevation angle, the electronic beam scanning continues, finally positioning the received beam to the feed position furthest from the central beam but at the opposite extreme from the beam originally used. Thus, electronic beam steering as described herein provides a mechanism for reducing the azimuth velocity required by the antenna positioner.

If the antenna being used has a very narrow beamwidth, additional feed elements in the elevation direction can be advantageously used following the principles described in the present invention. The elevation dynamics for antenna pointing as exemplified in FIG. 1 are less severe, but near the maximum elevation angle, the elevation angle travel reverses direction and the elevation velocity changes sign. Electronic beam steering in this portion of the satellite trajectory can reduce the required mechanical antenna positioning dynamics.

In an example embodiment, a method for antenna tracking includes a priori computing angular positions and velocities of a satellite using a satellite ephemeris, determining if an elevation angle is above a maximum elevation angle, and if the elevation angle is above the maximum elevation angle, employing a combination of mechanical and electronic beam steering techniques to steer an antenna beam.

In an example embodiment, a method for antenna tracking includes providing a central feed element in an antenna focal region with additional feed elements in an azimuth coordinate to provide a multitude of feed elements that each have a static beam position, and varying ratios of amplitudes of adjacent feed elements of the multitude of feed elements to electronically steer a beam between the static beam positions.

In an example embodiment, a system for antenna tracking includes additional feed elements for a reflector antenna with a central feed element, the additional feed elements being positioned on both sides of the central feed element along the azimuth coordinate of the system to provide a multitude of feed elements that each have a static beam position, and a beam steering network configured to vary ratios of amplitudes of adjacent feed elements of the multitude of feed elements to electronically steer a beam between the static beam positions.

Electronic beam steering in the azimuth coordinate can also be advantageously used during the initial acquisition of the satellite. By way of example, during initial acquisition, the antenna is positioned in the azimuth location where the satellite is anticipated to clear the horizon. The electronic mechanism of scanning the antenna beam in the azimuth coordinate described herein is then used to search for the received signal. In conjunction with a mechanism for verifying correct beam positioning, the azimuth scanning described herein can be used to locate the satellite during this initial acquisition phase. The electronic scanning described herein can also be used to verify that a signal has arrived through the main beam rather than the sidelobes to assure that the high gain of the main beam is receiving the signal rather than the lower gain of the sidelobes. Such beam scanning can be accomplished through open loop commanding as described above.

Although the present invention has been described in terms of the example embodiments above, numerous modifications and/or additions to the above-described embodiments would be readily apparent to one skilled in the art. It is intended that the scope of the present invention extend to all such modifications and/or additions.

We claim:

1. A system for antenna tracking, comprising:
    additional feed elements for a reflector antenna with a central feed element, the additional feed elements being positioned on both sides of the central feed element along the azimuth coordinate of the system to provide a multitude of feed elements that each have a static beam position; and
    a beam steering network configured to vary ratios of amplitudes of adjacent feed elements of the multitude of feed elements to electronically steer a beam between the static beam positions substantially maintaining a gain of the beam but varying a spatial position of the beam, the beam steering network being configured to substantially maintain a coincidence between a peak of the beam and a pattern null resulting from a difference in outputs of adjacent feed elements.

2. The system for antenna tracking of claim 1, wherein the beam steering network is configured to vary the ratios depending upon an a priori computation of a time history of required antenna positioning for the system.

3. The system for antenna tracking of claim 1, wherein the beam steering network is configured to vary the ratios depending upon an elevation angle of an antenna position of the system.

4. The system for antenna tracking of claim 1, wherein the beam steering network is configured to steer the beam between two extreme beam positions of the static beam positions when system dynamics are most severe.

5. The system for antenna tracking of claim 1, wherein the beam steering network includes an attenuator for each of the multitude of feed elements, the attenuators being set to vary amplitudes between adjacent feed elements.

6. The system for antenna tracking of claim 1, wherein the beam steering network includes a power divider.

7. The system for antenna tracking of claim 1, wherein the beam steering network includes electronics for combining outputs of adjacent feed elements to produce the beam.

8. The system for antenna tracking of claim 1, wherein the beam steering network includes electronics for subtracting outputs of adjacent feed elements to provide a subtracted channel for verifying that the beam is aligned with a received signal.

9. The system for antenna tracking of claim 1, wherein the beam steering network includes electronics for selecting a pair of outputs of adjacent feed elements to be combined.

10. The system for antenna tracking of claim 1, wherein the beam steering network includes electronics for selecting an amplitude combination of adjacent feed elements.

11. A method for antenna tracking, comprising:
    providing a central feed element in an antenna focal region with additional feed elements in an azimuth coordinate to provide a multitude of feed elements that each have a static beam position;
    varying ratios of amplitudes of adjacent feed elements of the multitude of feed elements to electronically steer a beam between the static beam positions substantially maintaining a gain of the beam but varying a spatial position of the beam; and
    substantially maintaining a coincidence between a peak of the beam and a pattern null resulting from a difference in outputs of adjacent feed elements.

12. The method for antenna tracking of claim 11, further comprising:
    determining a difference signal from outputs of the multitude of feed elements; and
    minimizing the difference signal to track a received signal.

13. The method for antenna tracking of claim 11, wherein the ratios are varied depending upon an a priori determination of angular positions and velocities for a satellite to be tracked.

14. The method for antenna tracking of claim 11, wherein the ratios are varied depending upon a satellite ephemeris.

15. The method for antenna tracking of claim 11, wherein the ratios are varied to steer the beam between two extreme beam positions of the static beam positions.

16. The method for antenna tracking of claim 11, wherein the ratios are varied to steer the beam between two extreme beam positions of the static beam positions during a high elevation angle portion of a satellite trajectory.

17. The method for antenna tracking of claim 11, wherein the ratios are varied to steer the beam between two extreme beam positions of the static beam positions during a tracking interval determined to have particular beam steering dynamics requirements.

* * * * *